US012278903B2

(12) United States Patent
Robinson-Morgan et al.

(10) Patent No.: US 12,278,903 B2
(45) Date of Patent: Apr. 15, 2025

(54) SYSTEMS AND METHODS FOR USE IN IMPLEMENTING SELF-EXCLUSION PREFERENCES

(71) Applicant: MASTERCARD INTERNATIONAL INCORPORATED, Purchase, NY (US)

(72) Inventors: Bryn Anthony Robinson-Morgan, Mosborough Village (GB); Liang Tian, Rye Brook, NY (US); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 229 days.

(21) Appl. No.: 17/976,144

(22) Filed: Oct. 28, 2022

(65) Prior Publication Data

US 2023/0216680 A1 Jul. 6, 2023

Related U.S. Application Data

(60) Provisional application No. 63/295,122, filed on Dec. 30, 2021.

(51) Int. Cl.
*H04L 9/32* (2006.01)
*H04L 9/40* (2022.01)

(52) U.S. Cl.
CPC .......... *H04L 9/3213* (2013.01); *H04L 9/3226* (2013.01); *H04L 63/0807* (2013.01)

(58) Field of Classification Search
CPC ......... H04L 9/32–3297; H04L 63/0807; H04L 63/10–108
See application file for complete search history.

(56) References Cited

U.S. PATENT DOCUMENTS

| | | | |
|---|---|---|---|
| 6,330,566 B1 | 12/2001 | Durham | |
| 9,001,977 B1* | 4/2015 | Ramalingam | H04M 3/385 379/142.05 |
| 11,429,975 B1* | 8/2022 | Asefi | G06F 21/62 |
| 2004/0128546 A1* | 7/2004 | Blakley, III | H04L 63/102 726/8 |
| 2015/0032627 A1* | 1/2015 | Dill | G06Q 20/385 705/44 |

(Continued)

*Primary Examiner* — Madhuri R Herzog
(74) *Attorney, Agent, or Firm* — Harness, Dickey & Pierce, P.L.C.

(57) ABSTRACT

Systems and methods are provided for imposing self-exclusion preferences for data access. One example computer-implemented method includes, in response to a request by a user to impose a self-exclusion preference on a digital identity of the user, requesting a token for the digital identity. The method also includes receiving and storing the token and a secret associated with the token in a record associated with the user and assigning the self-exclusion preference to the token. The method then includes receiving a request to share an identity attribute of the user's digital identity with a relying party, where the request includes the token, and retrieving the self-exclusion preference assigned to the token. And, in response to validation of the request to share the identity attribute, based on the self-exclusion preference, authorizing a mobile device of the user to share the at least one identity attribute with the relying party.

15 Claims, 5 Drawing Sheets

(56) References Cited

U.S. PATENT DOCUMENTS

| | | | |
|---|---|---|---|
| 2016/0253651 A1* | 9/2016 | Park | G06Q 20/34 |
| | | | 705/39 |
| 2019/0220834 A1* | 7/2019 | Moshal | G06Q 20/102 |
| 2019/0342695 A1 | 11/2019 | Klein et al. | |
| 2020/0136824 A1 | 4/2020 | Allen et al. | |
| 2020/0186530 A1 | 6/2020 | Nandakumar | |
| 2021/0377055 A1 | 12/2021 | Leibmann et al. | |

* cited by examiner

SYSTEMS AND METHODS FOR USE IN IMPLEMENTING SELF-EXCLUSION PREFERENCES

CROSS-REFERENCE TO RELATED APPLICATION

This application claims the benefit of, and priority to, U.S. Patent Application No. 63/295,122, filed on Dec. 30, 2021. The entire disclosure of the above application is incorporated herein by reference.

FIELD

The present disclosure is generally directed to systems and methods for use in establishing and implementing self-exclusion preferences for data access, and in particular, to systems and methods for use in leveraging tokens to impose rules on data access and/or on sharing data in connection with implementation of the self-exclusion preferences.

BACKGROUND

This section provides background information related to the present disclosure which is not necessarily prior art.

In various networks, personal identifying information (PII) for users is often included in identity data structures associated with the users. In turn, the identity data structures of the users are typically stored in either centralized or distributed storage, and arranged to be disseminated in response to requests from the users and/or relying parties associated with the users (e.g., in response to requests for the PII, etc.). In connection therewith, one or more entities often control the identity data structures, whereby access and sharing of the PII contained in the identity data structures is defined, and enforced, generally, by the one or more controlling entities.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Users are associated with identities, to which the users may be authenticated in connection with various activities, such as, for example, requesting or directing services (e.g., healthcare services, travel services, telecommunication services, etc.), establishing accounts (e.g., bank accounts, retirement accounts, email accounts, etc.), etc. In connection therewith, the activities may be associated with certain qualifications based on the identities of the users, including, for example, specific ages of the users, or ages of the users exceeding certain minimum ages for the given activities, etc. What's more, certain ones of the activities may not always be in the best interests of the users, whereby restrictions may be imposed on the activities by the users, or by others associated with the users, or based on legal and/or regulatory restrictions (e.g., by governments, etc.). However, such restrictions may be difficult to coordinate, as different identity providers may be leveraged and/or because the restrictions may require sensitive personal information to be stored along with the restrictions to ensure proper handling and/or implementation.

Uniquely, the systems and methods herein provide for self-exclusion preferences to be imposed on digital identities of users residing in mobile devices of the users. In particular herein, an identity attribute of a user is linked to an identifier, which is associated with a self-exclusion platform and tied to a generated token. The token is then shared with a relying party (in connection with interacting with the user, etc.), along with other identifiers (and/or tokens) for other attributes, potentially, and redeemed at the self-exclusion platform. In connection therewith, the token is used to find the identifier for the given attribute and any associated self-exclusion preference(s) regarding the identity attribute. When the preference(s) is(are) satisfied, the identifier is provided to the mobile device with permission to share the identity attribute with the relying party. In this manner, the identifier and token are employed as a restriction on sharing the identity attribute, where the identifier and token are tied to a specific self-exclusion preference(s) imposed by the user on the given attribute (and/or given digital identity). As such, the identity attribute is maintained as part of the digital identity and is protected, while self-exclusion preferences thereon are imposed.

Figure 1:
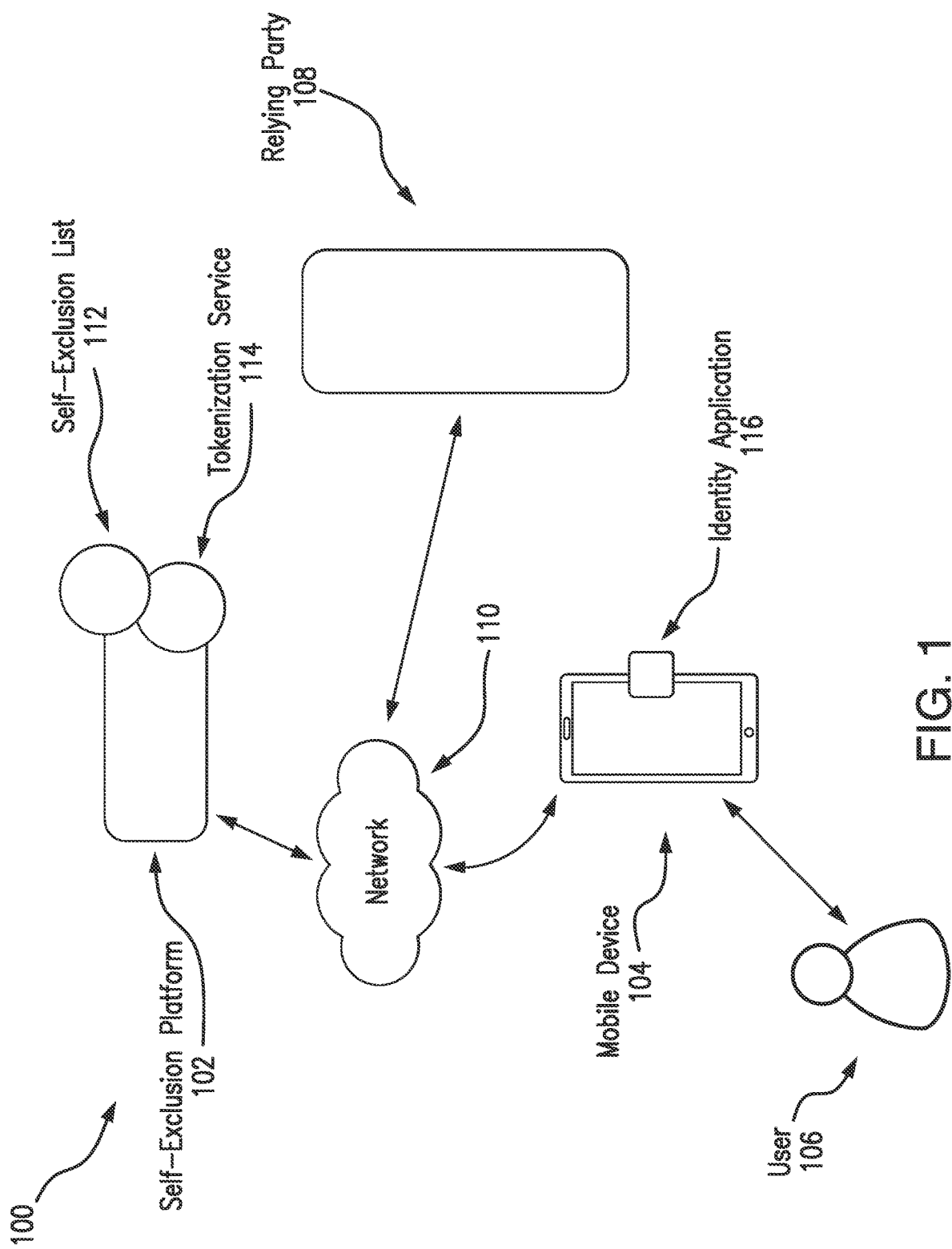
FIG. 1 illustrates an example system of the present disclosure suitable for use in imposing self-exclusion preferences in connection with the sharing of attributes associated with users.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users and relying parties, platforms for various services, particular services available, associated and/or related databases, privacy concerns and/or requirements, etc.

The illustrated system 100 generally includes a self-exclusion platform 102, a mobile device 104 associated with a user 106, and a relying party 108, each of which is coupled to network 110. The network 110 may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network 110 may include multiple different networks, where one or more of the multiple different networks is then accessible to particular ones of the self-exclusion platform 102, the mobile device 104, and the relying party 108.

In this example embodiment, the self-exclusion platform 102 is generally configured to coordinate self-exclusions (or self-exclusion preferences (also referred to as exclusion preferences herein)) for various users, including the user 106. The self-exclusion platform 102 is illustrated as a standalone service in FIG. 1, but may be associated with or integrated with another service and/or with another platform in other embodiments. For example, the self-exclusion platform 102 may be implemented and/or integrated into an identification service provider (IDP), or into a financial platform such as, for example, a payment network (e.g., MASTERCARD payment network, etc.), or into another service or platform, etc.

As shown in FIG. 1, the self-exclusion platform 102 includes a self-exclusion list 112 and a tokenization service 114. The self-exclusion list 112 includes a data structure of rules, which may be specific to a user or which may be general to multiple users (or combinations thereof). The rules may each further be associated with a specific identifier, referred to herein as a rule identifier (or rule ID) (whereby a given user may have multiple different rules and thus multiple different rule IDs). Example rules include, without limitation, time limits for purchase of certain products (e.g., alcohol can be purchased only between 13:00-18:00 on Saturdays and Sundays, etc.), transaction limits (e.g., gambling transactions limited to $50, etc.), limitations of accounts to specific relying parties (e.g., by name, by merchant category code (MCC), etc.), override conditions for the given rules, etc. It should be appreciated that several different types of rules, associated with limitations of disclosing identifying information of users, may be included in the self-exclusion list 112, again, which may be generic to multiple users or specific to one user, etc. That said, Table 1 illustrates example rules that may be included in the self-exclusion list 112 for the user 106.

TABLE 1

| Rule ID | Transaction Type | Allow Condition | Block Condition | Override |
|---|---|---|---|---|
| 12345 | Alcohol | Sat: 13:00-18:00 Sun: 13:00-18:00 | | User 4834623 AND User 37361934 |
| 12346 | Gambling | Transaction Value <$10 | Daily Spend >$50 | 7 days |
| 12357 | Retail | | Relying Party: 1234567890 | User 4834623 OR User 37361934 |

The tokenization service 114 is configured to generate tokens based on input data such as, for example, an identifier, user information, etc. The tokenization service 114 may be configured to generate different types of tokens specific to a given security requirement, or a specific technique, or accessibility, etc. This will be described in more detail below.

In the illustrated embodiment, the mobile device 104 includes a portable mobile device such as, for example, a tablet, a smartphone, a personal computer, or other suitable device, etc. The mobile device 104 also includes a network-based identity application 116, which configures the mobile device 104 to perform one or more operations, as described herein. In the illustrated embodiment, the application 116 is provided by and/or associated with an identification service provider (not shown), as a standalone application (e.g., dedicated to identity operations, etc.) or as another application, which includes such identity operations in combination with other operations (e.g., as part of a financial application (e.g., a digital wallet application, a banking application, etc.), an email application, a social-network application, a service provider application, a health application, etc.). The application 116 may be integrated in one or more manners, including, for example, as a software development kit (SDK) integrated therein whereby the SDK is provided by and/or associated with the identification service provider.

That said, it should be appreciated that the mobile device 104 may include other devices under control of the user 106 in other embodiments, including, for example, smart devices (e.g., smart watches, smart rings, etc.), personal data stores, etc.

The relying party 108 in the system 100 may include any entity and/or person, which receives identifying information (e.g., PII, etc.) associated with or specific to the user 106 (or other users) and expects and/or intends to rely on the identifying information for one or more purposes. For example, the relying party 108 may include a merchant, financial institution, service provider, etc., with which the user 106 may interact for one or more products, services, and/or other interactions (and to which the user 106 may be required to present at least one aspect of his/her identity in order to receive the one or more products, services, and/or interactions). As an example, the relying party 108 may include a merchant, which offers alcoholic beverages for sale, whereby the user 106 is required to be a certain age to purchase (e.g., 21 years old, 18 years old, etc.). In another example, the relying party 108 may include a creditor, which provides loan services to the user 106 (e.g., as a bank, etc.), or which provides access to funds (e.g., as a cash lender, gambling establishment, etc.), etc. In yet another example, the relying party 108 may include a merchant, or retailer, associated with a specific name, category (e.g., MCC, etc.), or location, etc.

While only one self-exclusion platform 102, one mobile device 104, one user 106, and one relying party 108 are illustrated in the system 100, it should be appreciated that additional ones of these parts/parties may be included in other system embodiments. Specifically, for example, it should be appreciated that other system embodiments will generally include multiple other users and multiple other relying parties, etc.

With continued reference to FIG. 1, when the user 106 decides to link an identity attribute to a specific rule and/or exclusion preference herein, the user 106 accesses the application 116 at the mobile device 104. The mobile device 104, as configured by the application 116, authenticates the user 106 and then receives inputs from the user 106 to define the desired exclusion. The mobile device 104, as configured by the application 116, then compiles a request for the self-exclusion service offered by the self-exclusion platform 102 and transmits the request to the self-exclusion platform 102. The request includes an instruction to impose an exclusion (or protection, etc.) to the user's digital identity, which provides a rule-based restriction on the sharing of the digital identity, or more specifically, an attribute thereof, based on the imposed exclusion (or rule, etc.).

The self-exclusion platform 102 is configured to receive the request from the mobile device 104. In response, the self-exclusion platform 102 is configured to generate an identifier for the attribute identified in the request (broadly, for the digital identity) and to define the identifier as a link between the attribute (or, more generally, the digital identity) and the self-exclusion service. The identifier may be (or may include) any numeric and/or alpha character(s), which is/are unique (at least as to the self-exclusion platform 102) to the attribute. The self-exclusion platform 102 is configured to store the identifier (e.g., in the self-exclusion list 112, or otherwise, etc.). Next, the self-exclusion platform 102 is configured to request tokenization, from the tokenization service 114, of the identifier. In turn, the tokenization service 114 is configured to generate a token for the identifier and a secret, and to compile a record, which includes the token and the secret (and, in some examples, the identifier). The tokenization service 114 is configured to then return the record (including the token and the secret (and, again, in some examples the identifier) to the self-exclusion platform 102. And, the self-exclusion platform 102 is configured to pass the token and the secret back to the mobile device 104, and in particular, the identity application 116.

The user 106 may then decide on the specific exclusion preference to be included for the attribute (and corresponding digital identity). As explained above, the exclusion preference may be related to time, times of the day, days of the week, transaction values/amounts, locations, names and/or categories of relying parties, velocity of interactions, periodic spend limits, etc., or other suitable aspects of a transaction or interaction associated with a product or service, etc. In connection therewith, the mobile device 104, as configured by the application 116, may present a list of exclusion preferences to the user 106 to select, or may provide options to enter an exclusion preference, or further may provide for exclusion templates where a form of the exclusion preference is provided, but specifics of the exclusion preference (e.g., amount, category, relying party, etc.) are selected and/or entered by the user 106. The exclusion preference may include, also, one or more override conditions, whereby the exclusion preference may be overridden. An override condition may include an interval (e.g., seven days since last cash advance, etc.) or a specific user, such as a third-party user, who is associated with forming and/or overriding the exclusion preference.

Upon identification of the exclusion preference (or preferences), the mobile device 104, as configured by the application 116, submits the exclusion preference to the self-exclusion platform 102. The self-exclusion platform 102, in turn, is configured to generate a rule ID for the given exclusion preference and store the exclusion preference (along with the rule ID therefor) in the self-exclusion list 112 (see, Table 1), in association with the identifier and/or the token, and to confirm the exclusion preference to the user 106, at the mobile device 104. In addition, in connection with confirming the exclusion preference to the user 106, the self-exclusion platform 102 is also configured to return the rule ID for the given exclusion preference to the user 106, at the mobile device 104 (e.g., at the application 116, etc.), for future reference to a particular exclusion preference (or rule) in connection with an action by the user 106 to amend the exclusion preference, delete the exclusion preference, or share the related attribute with the relying party 108 (or other relying party).

It should be appreciated that, from time to time, as desired, the user 106 may access the self-exclusion service in a manner consistent with the above, to create new exclusion preferences, or modify or delete existing exclusion preferences (e.g., based on rule IDs associated with the existing exclusion preferences, etc.), etc.

What's more, the exclusion preference created above and associated with the user's digital identity may involve (e.g., as an override feature or criteria, etc.) a third-party user, different than the user 106. The third-party user may be permitted to override the exclusion preference, whereby the exclusion preference may identify the third-party user and provide contact information for the third-party user. In this manner, the self-exclusion platform 102 may solicit consent from the third-party user, in addition to or instead of the consent of the user 106. In one example, the user 106 may include the third-party user (not shown) in the sign-up for the self-exclusion service, whereby the authentication of the user 106 includes authentication of the user 106 and also authentication of the third-party user at his/her own mobile device (not shown). Once authenticated, the mobile device of the third-party user shares an identifier with the self-exclusion platform 102, which is associated with the exclusion preference entered and/or submitted by the user 106 as described above. The identifier is then required, or may be required, to alter the exclusion preference associated therewith. In this manner, the dual authentication of the user 106 and the third-party user is necessary for the mobile device of the third-party user to pass the identifier to the self-exclusion platform 102 to alter the exclusion preference.

Additionally, or alternatively, when the third-party user is identified as an override condition, the self-exclusion platform 102 may solicit an override from the third-party user, or the third-party user may invoke the self-exclusion service (e.g., as a relying party, etc.) to override the exclusion preference associated with the user 106.

Subsequently, after the exclusion preference (and override, if provided) is stored in the self-exclusion list 112, and when the user 106 desires to present the digital identity (and in particular, the attribute thereof linked to the generated exclusion preference) to the relying party 108, in response to a request from the relying party 108, the user 106 accesses the identity application 116 at the mobile device 104. The mobile device 104, as configured by the application 116, authenticates the user 106 and connects with the relying party 108 (e.g., in response to a user selection and/or input at the mobile device 104, etc.). For example, the user 106 may connect with the relying party 108 via an openID connect (OIDC), a security assertion markup language (SAML), or a decentralized identifier (DID) communication connection involving a computing device of the relying party 108 and the mobile device 104 of the user 106 (e.g., via the identity application 116, via an identity network, via a peer-to-peer connection, etc.). And, in doing so, the user 106 may authenticate and consent for the connection and the sharing of attributes. Once connected, the relying party 108 is configured, then, to request the attribute from the identity application 116. In turn, the mobile device 104, as configured by the identity application 116, solicits consent to share the attribute, directly or as a response to a query, with the relying party 108.

When the user 106 consents, the mobile device 104, as configured by the identity application 116, creates a self-exclusion package, which includes the token, a relying party identifier for the relying party 108, a validity interval for the token, and a rule ID for the relevant exclusion preference. The mobile device 104, as configured by the identity application 116, signs the package with the secret and passes the signed package to the relying party 108. In addition to the package, the mobile device 104, as configured by the identity application 116, may further provide one or more flags, where the flag indicates, for example, an age of the digital identity (e.g., less than seven days, etc.), or other characteristic thereof, etc.

In turn, the relying party 108 is configured to invoke the self-exclusion platform 102, by passing the signed package thereto. The self-exclusion platform 102, then, is configured to verify the self-exclusion package, by the signature, and verify the validity interval is indeed valid for the package. Once verified and validated, the self-exclusion platform 102 is configured to pass the token, from the package to the tokenization service 114, where the tokenization service 114 is configured to lookup the identifier for the attribute linked to the token. The tokenization service 114 is configured to return the identifier to the self-exclusion platform 102. The self-exclusion platform 102 is configured to retrieve the exclusion preference(s) associated with the identifier, from the self-exclusion list 112, and verify the exclusion preference(s) and either pass or decline the request from the relying party 108 associated with the package based thereon. The pass or decline may be based on the relying party identifier, the time and/or date, the one or more flags, etc., for example, as applied to the exclusion preference, etc.

In response, the self-exclusion platform 102 is configured to return a pass authorization or a decline authorization to the relying party 108. The relying party 108 is configured to provide the authorization to the mobile device 104, whereby the attribute is shared, or not, with the relying party 108, based on the authorization.

It should be appreciated that the self-exclusion platform 102 may be configured to record requests from one or more relying parties, including the relying party 108, in association with the token and/or the identifier. In particular, one or more different exclusion preferences may be based on more than one package. For example, where an amount is limited as indicated in an exclusion preference, the self-exclusion platform 102 may be configured to keep a running total of requests for a defined interval, whereby previous pass authorizations may give rise to a declined authorization for a subsequent request.

It should further be appreciated that the specific configuration of the self-exclusion platform 102, the mobile device 104 and the relying party 108 may be specific to the particular exclusion preference, whereby additional or different interactions may be included to determine whether an authorization to share an identity attribute(s) with the relying party is allowed or declined, etc.

Figure 2:
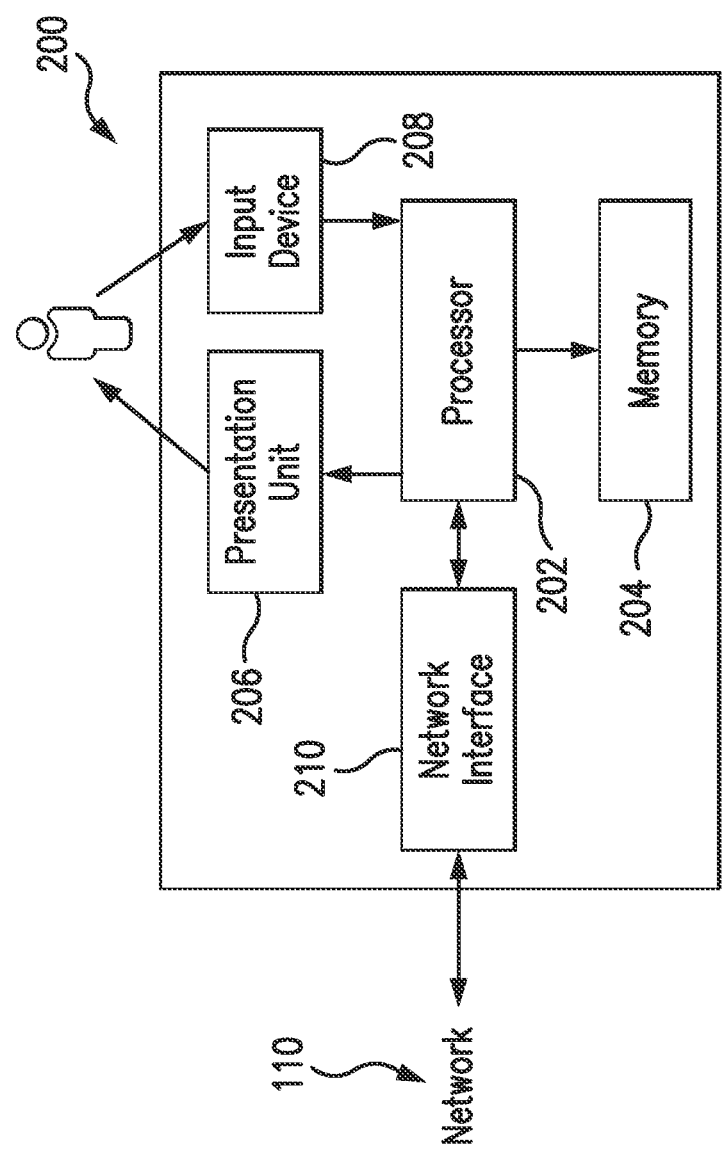
FIG. 2 is a block diagram of an example computing device that may be used in the system of FIG. 1.

FIG. 2 illustrates an example computing device 200 that may be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the self-exclusion platform 102, the mobile device 104, the relying party 108, and the tokenization service 114 may be considered, may include, and/or may be implemented in a computing device consistent with the computing device 200, coupled to (and in communication with) the one or more networks of the system 100 (e.g., network 110, etc.). However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identifying information (e.g., PII, etc.), identifiers, tokens, secrets, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., identifying information, options for exclusion preferences, etc.), etc. And, various interfaces (e.g., as defined by the application 116, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user 106 (i.e., user inputs) of the computing device 200 such as, for example, user inputs to select one or more exclusion preferences, designate one or more attributes for the exclusion preferences, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network, a mobile network adapter, or other device capable of communicating to one or more different networks herein (e.g., network 110, etc.) and/or with other devices described herein. In some example embodiments, the computing device 200 may include the processor 202 and one or more network interfaces incorporated into or with the processor 202.

Figure 3:
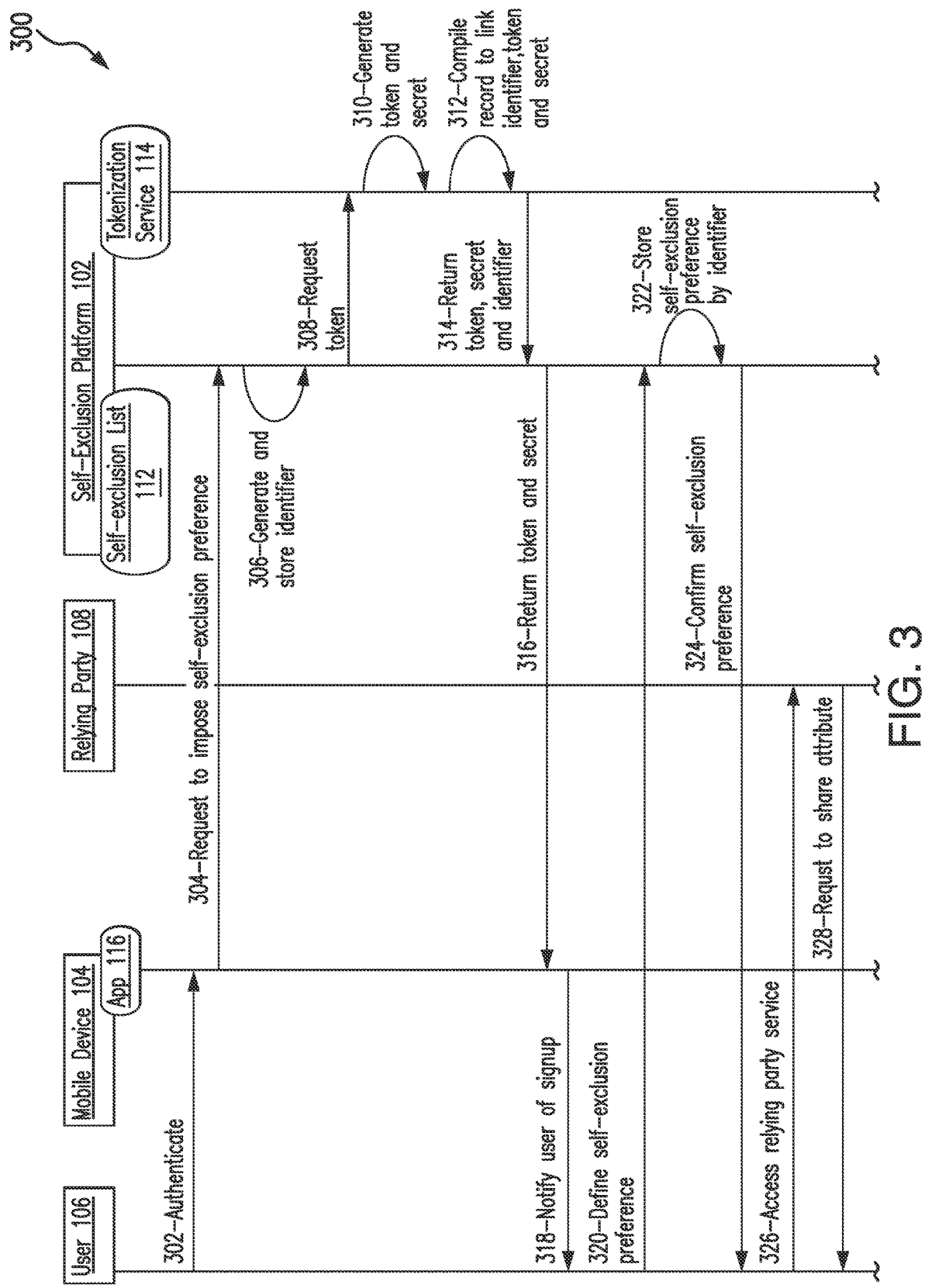
FIG. 3 illustrates an example method of the present disclosure, which may be implemented in connection with the system of FIG. 1 for use in imposing self-exclusion preferences on identity attributes of users.
Figure 3:
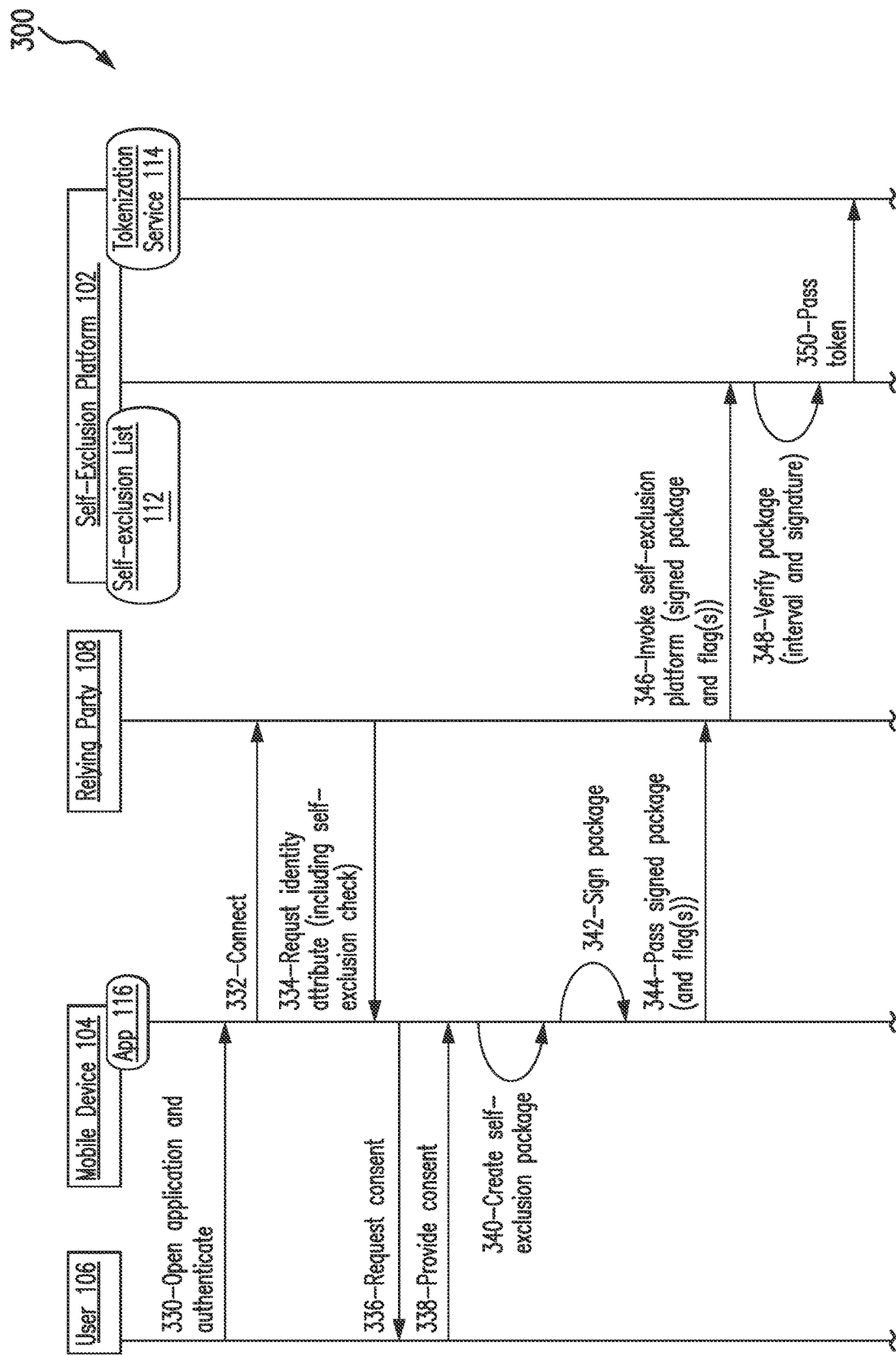
Figure 3:
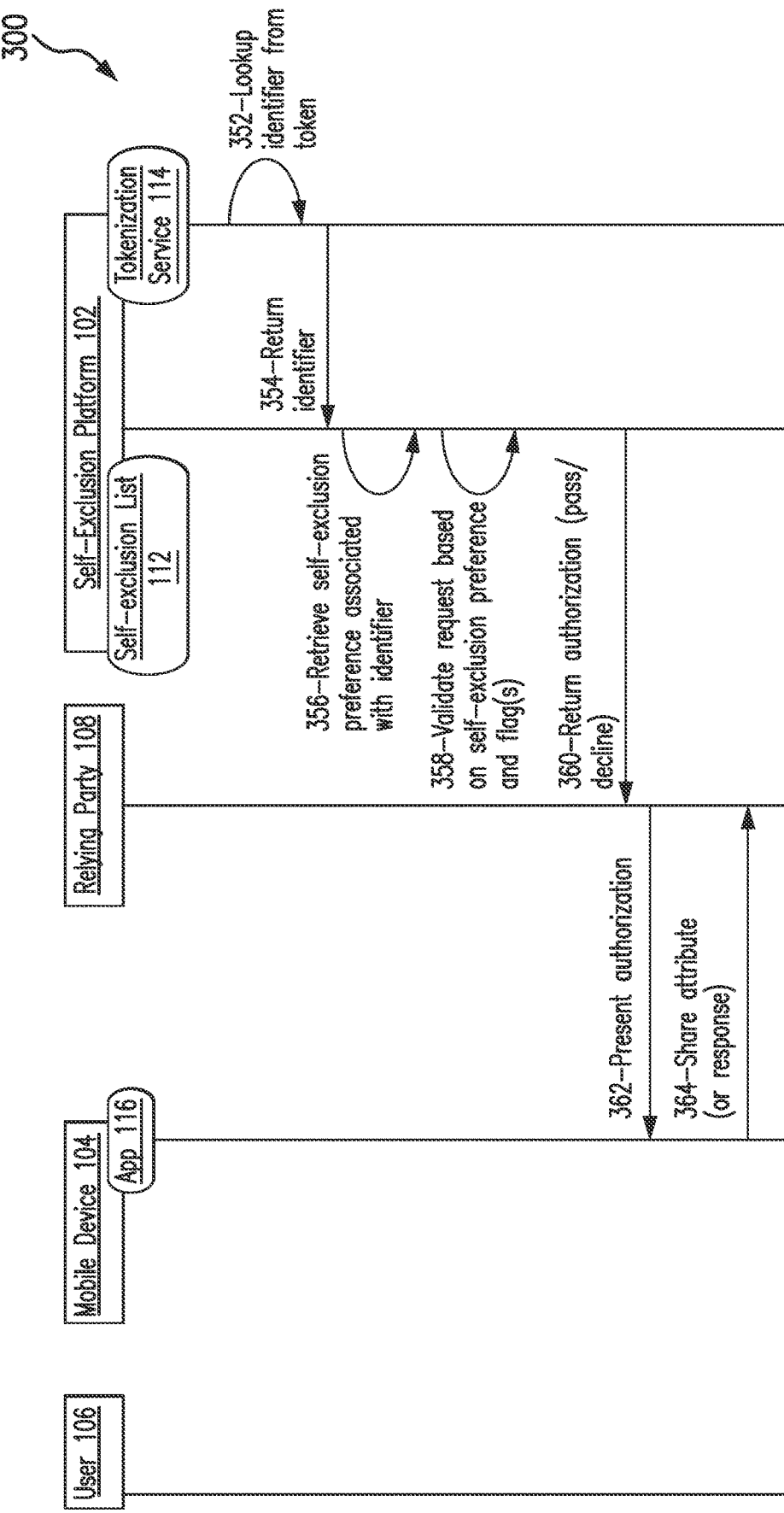

FIG. 3 illustrates an example method 300 for use in imposing self-exclusion preferences (also referred to as exclusion preferences herein) on identity attributes of users. The example method 300 is described as implemented in system 100, with reference to the self-exclusion platform 102, the mobile device 104 and the relying party 108, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 300.

At the outset in the method 300, the user 106 may desire to connect an identity attribute to one or more exclusion preferences. For example, the user 106 may desire to limit certain purchases requiring proof of age (e.g., alcohol, etc.) to weekends, or after a certain time per day, or may desire to limit an amount of funds available in cash for certain interactions at a given relying party and/or at a given time/date, etc. Regardless of the desire, the user 106 accesses the identity application 116, at the mobile device 104, and authenticates himself/herself, at 302, to the identity application 116. The authentication may be based on a username, passcode, password, or biometric, or combination thereof. In connection therewith, the user 106 also indicates the desire to connect an attribute to an exclusion preference. In doing so, the user 106 may simply indicate the desire to do so, or the user 106 may specify the attribute (e.g., date of birth, etc.), etc.

In response, the user 106 calls (or accesses or identifies) the self-exclusion service offered and/or hosted by the self-exclusion platform 102. In particular, at 304, the mobile device 104 requests to implement (e.g., create and impose, etc.) an exclusion preference (or self-exclusion preference) to the self-exclusion platform 102. The request may include an identifier associated with the user 106 (e.g., an application ID, a phone number, an email address, etc.), or other data to identify the user 106 in the context of the exclusion preference. The self-exclusion platform 102 generates, at 306, an identifier for the request, which is a link between the digital identity (and/or particular attribute thereof) of the user 106 stored in the mobile device 104 and the self-exclusion service. The identifier may be unique to the request or to the user 106, and unique in the context of the self-exclusion platform 102, but may include any combination of numbers, letters, and/or symbols, etc. For example, the identifier may be 12345. The identifier, after being generated, is stored by the self-exclusion platform 102 in the self-exclusion list 112 (broadly, in memory (e.g., memory 204, etc.)), in this example embodiment.

Next, at 308, the self-exclusion platform 102 requests a token for the identifier from the tokenization service 114. The tokenization service 114, consistent with the request, generates, at 310, a token for the identifier of the request and also a secret associated with the token and/or the identifier. Table 2 illustrates an example token and secret associated with the example request identifier 12345. Notwithstanding the example below, it should be appreciated that the identifier, token and secret may be any suitable values, usable and/or consistent with the operations and/or steps described herein.

TABLE 2

| Identifier | 12345 |
| Token | 1516239022 |
| Secret | S61sw!W4wAW0wl |

At 312, the tokenization service 114 compiles a record for the request, which includes the request identifier, the generated token and the secret, whereby each is linked. The tokenization service 114 stores the record in memory (e.g., the memory 204, etc.) (e.g., in the self-exclusion list 112, etc.), etc. The tokenization service 114 also returns, at 314, the token, the secret and, potentially, the request identifier to the self-exclusion platform 102.

In turn, the self-exclusion platform 102 returns, at 316, the token and the secret to the mobile device 104 (specifically, to the application 116, etc.) (and, in some examples, the request identifier, although this is not required). The mobile device 104 stores the token and the secret in memory (e.g., the memory 204, etc.) and notifies, at 318, the user 106 of signup for the self-exclusion service and ability to define exclusion preferences for the given attribute of the user's digital identity. Thereafter, the user 106 is invited to define the exclusion preferences. In one example, the mobile device 104 may display a listing of exclusion preferences, from which the user 106 may select. The exclusion preferences displayed to the user 106 may be complete, or they may be templates, whereby the user 106 is solicited for an amount, time, date, relying party identifier or category, etc. to complete the preference(s). In another example, the user 106 may be provided the option to define the exclusion preference(s) in another form, such as, by plain text or otherwise. In the particular example method 300, the user 106 defines an exclusion preference, through which a date of birth (e.g., evidence of age exceeding a limit, etc.) is only able to be shared on weekends between 13:00 and 18:00, thereby limiting the purchase of certain products and/or service at other times. The exclusion preference is then defined (or provided) to the self-exclusion platform 102, at 320.

The self-exclusion platform 102 stores, at 322, the exclusion preference in memory (e.g., the self-exclusion list 112, etc.) in conjunction with the request identifier, whereby the exclusion preference is linked to the request identifier (and attribute identified in the request). The self-exclusion platform 102 confirms, at 324, the exclusion preference as associated with the user's identity, and thus its availability in subsequent requests for the same.

At some time thereafter, the user 106 accesses the relying party, at 326, for example, by access of a website associated with the relying party 108, or by requesting a product or service associated with the relying party 108 in person (e.g., using an NFC reader or QR scan at the relying party 108, etc.) or otherwise, etc. In response, at 328, the relying party 108 requests the user 106 to share an identity attribute sufficient to satisfy a requirement to purchase the product or service or allow the requested interaction. For example, where the user 106 desires to purchase an alcoholic beverage, the attribute may include a date or birth or present age, or whether the user 106 is above a certain age. That said, it should be appreciated that the attribute requested by the relying party 108 may be any attribute associated with the user 106, including, for example, name, address, email address, phone number, government identification number (e.g., social security number, Aadaar number, etc.), biometric, medical record (e.g., vaccine status, etc.), credit data, etc.

In response, the user 106 opens the identity application 116, at the mobile device 104, and authenticates himself/herself, at 330. The user 106 then provides an input to the mobile device 104, as an instruction to share the requested attribute with the relying party 108. The mobile device 104 connects, at 332, with the relying party 108. As described above, for example, the user 106 may connect with the relying party 108 via an OIDC/SAML/DID communication connection involving a computing device of the relying party 108 and the mobile device 104 of the user 106 (e.g., via the identity application 116, via an identity network, via a peer-to-peer connection, etc.), initiated using a button click (e.g., at the website of the relying party 108, etc.), a hyperlink (e.g., at the website of the relying party 108, etc.), a QR code (e.g., in person at the relying party 108, etc.), a NFC tap (e.g., in person at the relying party 108, etc.), etc. The relying party 108 responds by requesting, at 334, the identity attribute for the user 106. In addition, in this example embodiment, the relying party 108 further requests a self-exclusion check for the identity attribute before sharing. It should be appreciated that this request for the self-exclusion check may be separate from the request for the attribute, or potentially, inherent in the request for this identity attribute or in any request for any personal identity information of the user 106, etc. (e.g., such that the application 116 automatically implements the self-exclusion check in response to any request for an identity attribute or in response to a request for particular identity attributes, etc.).

The mobile device 104, in response to the request, requests consent from the user 106 to share the identity attribute, at 336, and then the user 106 provides consent to the mobile device 104, at 338.

In response to the request and the consent in this example, the mobile device 104 creates, at 340, a self-exclusion package. The package may include the token, a relying party identifier for the relying party 108, a validity interval for the token, and a rule ID for the given self-exclusion preference associated with the requested attribute. It should be appreciated that other, or different, data may be included in the package, as needed or desired, for example, to locate and evaluate the relevant self-exclusion preference of the user 106, etc. The mobile device 104 then signs, at 342, the self-exclusion package with the secret. An example of the self-exclusion package and corresponding signed package are illustrated in Table 3. It should be appreciated that in some examples the token may be included in the package (as generally illustrated in Table 3), or it may be separate from the package and communicated therewith.

TABLE 3

| | |
|---|---|
| Relying Party Identifier | 1234567890 |
| Validity | YYY-MM-DDT13:56:15Z |
| Request Identifier | 12345 |
| Rule ID | AB-12 |
| Token ID | 1516239022 |
| Secret | S61sw!W4wAW0wl |
| Signed Package | eyJhbGciOiJIUzI1NiIsInR5cCI6IkpXVCJ9.eyJSUCBJZ GVudGlmaWVyIjoiMTIzNDU2Nzg5MCIsIlZhbGlkaX R5IjoiMjYMS0wOC0xN1QxMzo1NjoxNVoiLCJSdW |

TABLE 3-continued xlIElEIjoiMTIzNDUiLCJUb2tlbiBJRCI6MTUxNjIzOT
AyMn0.oG3XOw-TzlzrLJwlwu071yU-
PZdOIiNnjcueLWwS4VU At 344, the mobile device 104 passes the signed package to the relying party 108. In addition to the signed package, the mobile device 104 may pass one or more flags indicative of the digital identity. For example, a flag may indicate that the digital identity, of which the attribute is a part, is less than one day, two days, or seven days, or more or less days old. Other data about the digital identity, or the attribute, may also be represented by the flags included with the signed package. In response, the relying party 108 invokes, at 346, the self-exclusion check with the self-exclusion platform 102, by passing the signed package and the flags(s) to the self-exclusion platform 102. In addition to the package, the relying party 108 may further pass details of the transaction and/or interaction giving rise to the request, such as, for example, transaction amount, relying party category (e.g., MCC, etc.) and/or relying party identifier, time/date, location, etc.

The self-exclusion platform 102 verifies, at 348, the package. The verification may include verifying the signature, as being based on the secret. In connection therewith, the self-exclusion platform 102 retrieves the secret based on the token included with the package. The self-exclusion platform 102 may also confirm that the request for the attribute, as represented by the signed package, is within the validity interval of the package. Once verified, the self-exclusion platform 102 passes, at 350, the token to the tokenization service 114. Upon receipt, the tokenization service 114 looks up, at 352, the request identifier associated with the token and returns, at 354, the identifier to the self-exclusion platform 102. Additionally, or alternatively, in various embodiments, the tokenization service 114 may further verify the package based on the secret and/or the validity interval (in lieu of the self-exclusion platform 102), prior to passing the request identifier back to the self-exclusion platform 102.

In turn, the self-exclusion platform 102 retrieves, at 356, the exclusion preference (or preferences) associated with the request identifier, and validates, at 358, the request for the attribute based on the exclusion preference (which may be subject to one or more override conditions). For example, where an exclusion preference indicates a specific interval to purchase alcohol, and the current time is outside of the interval, the self-exclusion platform 102 determines the request is invalid. In another example, where the request is associated with an attribute requested as part of a request for a line or credit or cash advance, and the exclusion preference includes an amount, which would be exceeded by the requested amount, the self-exclusion platform 102 determines the request is again invalid. In yet another example, where the exclusion preference bars a certain category of relying parties and the relying party 108 is not within that category, the self-exclusion platform 102 determined the request is valid.

In connection with the above, the self-exclusion platform 102 may also consider override conditions, as needed, for requests that are determined to be invalid. For example, the self-exclusion platform 102 may contact a third-party user to determine if the third-party user desires to override the exclusion preference (based on the given rule/exclusion preference) (e.g., via a mobile device and identity application consistent with the identity application 116, etc.).

Next, at 360, the self-exclusion platform 102 returns the authorization to the relying party 108, where the authorization indicates a pass when the request is validated and a decline when the request is not validated.

Thereafter, the relying party 108 presents, at 362, the authorization to the mobile device 104, as the holder of the digital identity. When the authorization includes a pass, the mobile device 104 shares, at 364, the attribute with the relying party 108, whereby the interaction for the product and/or service may proceed. Conversely, when the authorization includes a decline, the method 300 ends without the mobile device 104 sharing the attribute with the relying party 108.

In the instant example (e.g., in the method 300 of FIG. 3, etc.), the user 106 is described as linking an identity attribute of the user 106 himself/herself to a specific rule and/or exclusion preference. In other examples, other users may link an identity attribute(s) of the user 106 to a specific rule(s) and/or exclusion preference(s) (e.g., on behalf of the user 106, etc.). For instance, a parent, guardian, employer, or other user associated with the user 106 (based on some relationship therebetween (e.g., an employment relationship, fiduciary relationship, guardian relationship, other relationship, etc.)) may desire to link an identity attribute of the user 106 to a specific rule(s) and/or exclusion preference(s) as described herein. In such instances, the parent, guardian, employer, or other users may then implement, create, etc. the specific rule(s) and/or exclusion preference(s) on behalf of (and/or for) the user 106 (e.g., based on or in view of the relationship between the parent, guardian, employer, or other user and the use 106, etc.), consistent with the operation and/or steps described herein.

In view of the above, the systems and methods herein may permit users to manage restrictions, or broadly, exclusions, associated with identity dependent activities while transacting with relying parties. In particular, a user may be able to create a private, pairwise relationship between identifying information (e.g., stored in the user's mobile device, etc.) and specified exclusions (for example, via a self-exclusion service implemented through the self-exclusion platform). In doing so, the user is permitted to impose exclusions across multiple relying parties, which is provided without revealing unnecessary identifying information to the host of the exclusions, or the relying parties (whereby redundant copies of information may be created and undermine security associated with the provisioning of the digital identity (e.g., in the mobile devices, etc.)). What's more, because transactions may be appended to a record for the user at the self-exclusion platform, transactions may be updated to permit periodic limits as exclusions and thereby restrict further transactions within a desired period. Also, in connection with tokenization, identifiers associated with the identity information are accessible through consent of the user, but not otherwise. That said, the systems and methods herein may also allow use of the self-exclusion service across an entire ecosystem, for example, by setting rules or preferences applicable across all activities of a user and not at specific relying parties (although in some examples the rules/preferences may still implicate specific relying parties, etc.). In connection therewith, the service may inhibit cross-correlation and tracking of the user, in that the relying parties may not be informed of the basis on which/for which a transaction is approved or declined.

In addition, the systems and methods herein may permit the users to define override conditions, as part of the exclusion, whereby the exclusions can be over-ridden or amended.

What's more, the systems and methods herein are also directed to limited assessment transactions, where the users act on impulse to transact with the relying parties, whereby the transactions may be inhibited. To this end, the systems and methods herein may further utilize on one or more flags to address timing constraints associated with newly provisioned digital identities and/or attributes (e.g., those that are less than one day, less than two days, less than a week, etc.), as an improvement over use of independent digital identities where no instruction (or other accounting) is provided for newly provisioned digital identities.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example, (a) in response to a request by a user to impose at least one self-exclusion preference on a digital identity of the user, generating an identifier unique to the user; (b) requesting a token for the digital identity from a tokenization service computing device; (c) receiving the token and a secret associated with the token; (d) storing at least the token and the secret; (e) assigning the at least one self-exclusion preference to the token; (f) receiving, from a relying party, a request to share at least one identity attribute of the digital identity of the user with the relying party, the request including a signed package including said token; (g) passing the token to the tokenization service computing device, whereby the tokenization service computing device identifies the identifier associated with the user based on the token; (h) receiving the identifier from the tokenization service computing device; (i) retrieving the at least one self-exclusion preference associated with the identifier; (j) validating the request to share the at least one identity attribute of the digital identity of the user based on the at least one self-exclusion preference; and/or (k) authorizing, via the relying party, a mobile device associated with the user to share the at least one identity attribute of the digital identity of the user with the relying party.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in imposing self-exclusion preferences for data access, the method comprising:
   in response to a request by a user to impose at least one self-exclusion preference on a digital identity of the user, generating, by a computing device, an identifier unique to the user, the at least one self-exclusion preference including a rule defined by the user and specific to a transaction type, the rule including an allow condition and/or a block condition;
   requesting, by the computing device, a token for the digital identity from a tokenization service computing device;
   receiving, by the computing device, the token and a secret associated with the token;
   storing at least the token and the secret;
   assigning the at least one self-exclusion preference to the token;
   receiving, by the computing device, from a relying party, a request to share at least one identity attribute of the digital identity of the user with the relying party for a transaction consistent with the transaction type of the at least one self-exclusion preference, the request including a signed package including said token;
   passing, by the computing device, the token to the tokenization service computing device, whereby the tokenization service computing device identifies the identifier associated with the user based on the token;
   receiving, by the computing device, the identifier from the tokenization service computing device;
   retrieving, by the computing device, the at least one self-exclusion preference associated with the identifier;
   validating that the request to share the at least one identity attribute of the digital identity of the user is permitted based on the allow condition and/or the block condition of the at least one self-exclusion preference; and
   in response to the request being permitted, authorizing, by the computing device, via the relying party, a mobile device associated with the user to share the at least one identity attribute of the digital identity of the user with the relying party.

2. The computer-implemented method of claim 1, further comprising receiving the request to impose the at least one self-exclusion preference from the mobile device.

3. The computer-implemented method of claim 1, further comprising soliciting the at least one self-exclusion preference from the user, at the mobile device, prior to assigning the at least one self-exclusion preference to the token.

4. The computer-implemented method of claim 1, wherein the allow condition and/or the block condition of the at least one self-exclusion preference relates to an age of the user, a day of week, and/or a time of day.

5. The computer-implemented method of claim 1, further comprising:
   in response to the signed package, retrieving, by the computing device, the secret based on the token; and
   verifying the signed package based on the retrieved secret, prior to passing the token to the tokenization service computing device.

6. The computer-implemented method of claim 5, wherein verifying the signed package based on the retrieved secret includes verifying, by the tokenization service computing device, the signed package based on the retrieved secret; and
   further comprising searching, by the tokenization service computing device, for the identifier based on the token from the computing device, prior to returning the identifier to the computing device.

7. The computer-implemented method of claim 1, further comprising:
   generating, by the tokenization service computing device, the token and the secret in response to the request from the computing device for the token for the digital identity;
   compiling and storing, by the tokenization service computing device, a record including the token, the secret and the identifier; and providing the token and the secret to the computing device, in response to the request by the computing device for the token.

8. The computer-implemented method of claim 1, wherein validating the request to share the at least one identity attribute of the digital identity of the user includes validating one or more override conditions associated with the at least one self-exclusion preference.

9. A system for use in imposing self-exclusion preferences for data access, the system comprising:
   a self-exclusion platform including a computing device for communicating with a mobile device associated with a user and for communicating with a relaying party, the computing device configured to:
   in response to a request by the user, via the mobile device, to impose at least one self-exclusion preference on a digital identity of the user, generate an identifier unique to the user, the at least one self-exclusion preference including a rule defined by the user and specific to a transaction type, the rule including an allow condition and/or a block condition;
   request a token for the digital identity from a tokenization service computing device;
   receive the token and a secret associated with the token, from the tokenization service computing device;
   store, in a memory of the computing device, the token;
   assign the at least one self-exclusion preference to the token;
   receive, from the relying party, for a transaction consistent with the transaction type of the at least one self-exclusion preference, a request to share at least one identity attribute of the digital identity of the user, the request including a signed package including the token;
   pass the token to the tokenization service computing device;
   receive the identifier from the tokenization service computing device;
   retrieve the at least one self-exclusion preference associated with the identifier;
   validate that the request to share the at least one identity attribute of the digital identity of the user is permitted based on the allow condition and/or the block condition of the at least one self-exclusion preference; and
   in response to the request being permitted, authorize the mobile device to share the at least one identity attribute of the digital identity of the user with the relying party.

10. The system of claim 9, wherein the self-exclusion platform includes the tokenization service computing device; and
   wherein the computing device is further configured to receive the request to impose the at least one self-exclusion preference from the mobile device.

11. The system of claim 10, wherein the computing device is further configured to:
   solicit the at least one self-exclusion preference from the user, at the mobile device, prior to assigning the at least one self-exclusion preference to the token.

12. The system of claim 9, wherein the allow condition and/or the block condition of the at least one self-exclusion preference relates to an age of the user, a day of week, and/or a time of day.

13. The system of claim 9, wherein the computing device is further configured to:
   verify the signed package based on the retrieved secret, via the tokenization service computing device, prior to passing the token to the tokenization service computing device.

14. The system of claim 13, further comprising the tokenization service computing device, which is configured to:
   generate the token and the secret, in response to the request for the token; and
   compile and store a record including the token, the secret and the identifier, prior to providing the token and the secret to the computing device.

15. The system of claim 9, wherein the computing device is configured to validate the request to share the at least one identity attribute of the digital identity of the user by validating one or more override conditions associated with the at least one self-exclusion preference.

\* \* \* \* \*